(12) United States Patent
Visotsky (10) Patent No.: US 7,894,388 B2
(45) Date of Patent: Feb. 22, 2011

(54) METHOD AND APPARATUS FOR RELAY ZONE BANDWIDTH ALLOCATION

(75) Inventor: Eugene Visotsky, Buffalo Grove, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 798 days.

(21) Appl. No.: 11/620,531

(22) Filed: Jan. 5, 2007

(65) Prior Publication Data

US 2008/0165719 A1 Jul. 10, 2008

(51) Int. Cl.
*H04W 4/00* (2009.01)
(52) U.S. Cl. .................. 370/329; 370/341; 370/315; 370/436; 455/450; 455/452.2
(58) Field of Classification Search ......... 370/310–350, 370/431; 455/450, 451, 452.1, 452.2, 453
See application file for complete search history.

(56) References Cited

U.S. PATENT DOCUMENTS

| | | | |
|---|---|---|---|
| 6,327,254 B1 * | 12/2001 | Chuah | 370/328 |
| 7,072,295 B1 * | 7/2006 | Benson et al. | 370/230 |
| 2002/0003776 A1 * | 1/2002 | Gokhale et al. | 370/236 |
| 2006/0193280 A1 | 8/2006 | Lee et al. | |
| 2007/0081507 A1 * | 4/2007 | Koo et al. | 370/338 |
| 2007/0133500 A1 * | 6/2007 | Rajkotia et al. | 370/348 |
| 2007/0153746 A1 * | 7/2007 | Lee et al. | 370/335 |
| 2007/0268860 A1 * | 11/2007 | Taneja | 370/329 |
| 2008/0019423 A1 * | 1/2008 | Hu | 375/141 |
| 2008/0043668 A1 * | 2/2008 | Chen et al. | 370/329 |
| 2008/0075178 A1 * | 3/2008 | Lappetelainen et al. | 375/260 |
| 2008/0107062 A1 * | 5/2008 | Viorel et al. | 370/315 |
| 2010/0002618 A1 * | 1/2010 | Eichinger et al. | 370/315 |

OTHER PUBLICATIONS

Y. Liu et al "Integrated Radio Resource Allocation for Multihop Cellular networks with Fixed Relay Stations"; IEEE Journal, vol. 34, No. 11, Nov. 2006, pp. 2137-2146.
Hung-yu Wei et al—"Routing and Scheduling for AdhoCell Downlink Data Capacity Enhancement", IEEE 2004, pp. 2917-2921.
Haris Viswanathan et al, "Performance of Cellular Networks With Relays and Centralized Scheduling" IEEE, vol. 4, No. 5, Sep. 2005, pp. 2318-2328.
Wei-Pan Chen et al, "Rate Based Bandwidth Request Mechanism", IEEE S802.16j-06/147rl, Nov. 2006, 3 pages.

* cited by examiner

*Primary Examiner*—Kent Chang
*Assistant Examiner*—Magdi Elhag
(74) *Attorney, Agent, or Firm*—Randi L. Karpinia (57) ABSTRACT

A method and apparatus for allocation of channel resources for relay stations operating in a multihop wireless communication system is provided for herein. The method and apparatus includes a signaling protocol between a base station scheduler and a relay station scheduler so as to achieve efficient utilization of the sector channel resources, while minimizing signaling overhead due to base station-relay station scheduler interaction.

12 Claims, 9 Drawing Sheets

METHOD AND APPARATUS FOR RELAY ZONE BANDWIDTH ALLOCATION

FIELD OF THE INVENTION

The present invention relates generally to wireless communication systems and more particularly to the operation of a communication network utilizing relay stations.

BACKGROUND

An infrastructure-based wireless network typically includes a communication network with fixed and wired gateways. Many infrastructure-based wireless networks employ a mobile unit or host which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station.

In comparison to infrastructure-based wireless networks, such as cellular networks or satellite networks, ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of adhoc network nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination.

IEEE 802.16 is a point-to-multipoint (PMP) system with one hop links between a base station (BS) and a subscriber station (SS). Such network topologies severely stress link budgets at the cell boundaries and often render the subscribers at the cell boundaries incapable of communicating using the higher-order modulations that their radios can support. Pockets of poor-coverage areas are created where high data-rate communication is impossible. This in turn brings down the overall system capacity. While such coverage voids can be avoided by deploying BSs tightly, this drastically increases both the capital expenditure (CAPEX) and operational expenditure (OPEX) for the network deployment. A cheaper solution is to deploy relay stations (RSs) (also known as relays or repeaters) in the areas with poor coverage and repeat transmissions so that subscribers in the cell boundary can connect using high data rate links.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to relay zone bandwidth allocation in a multihop wireless communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of relay zone bandwidth allocation in a multi-hop wireless communication network described herein. The non-processor circuits may include, but are not limited to, a radio receiver, a radio transmitter, signal drivers, clock circuits, power source circuits, and user input devices. As such, these functions may be interpreted as steps of a method to perform relay zone bandwidth allocation in a multi-hop wireless communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention provides a method to allocate channel resources for Relay Stations (RS) operating in a multihop wireless communication system such as an IEEE 802.16j system. The IEEE 802.16j standard is an extension of the IEEE 802.16e standard, whereby the single-hop 802.16e network is extended to accommodate multihop routes between a Mobile Station (MS) and its serving Base Station (BS) through pre-deployed intermediate relay stations. All 802.16j network extensions to enable multihop operation are to be transparent to the MS. Within the embodiments described hereinafter, it is assumed that all RS deployed in a sector share channel resources with the MS assigned to the same sector. It is further assumed that all major scheduling functions for the sector reside at the BS, whereas each RS only possesses limited scheduling capabilities. This present invention provides a signaling protocol between the BS and RS schedulers so as to achieve efficient utilization of the sector channel resources, while minimizing signaling overhead due to BS-RS scheduler interaction.

Figure 1:
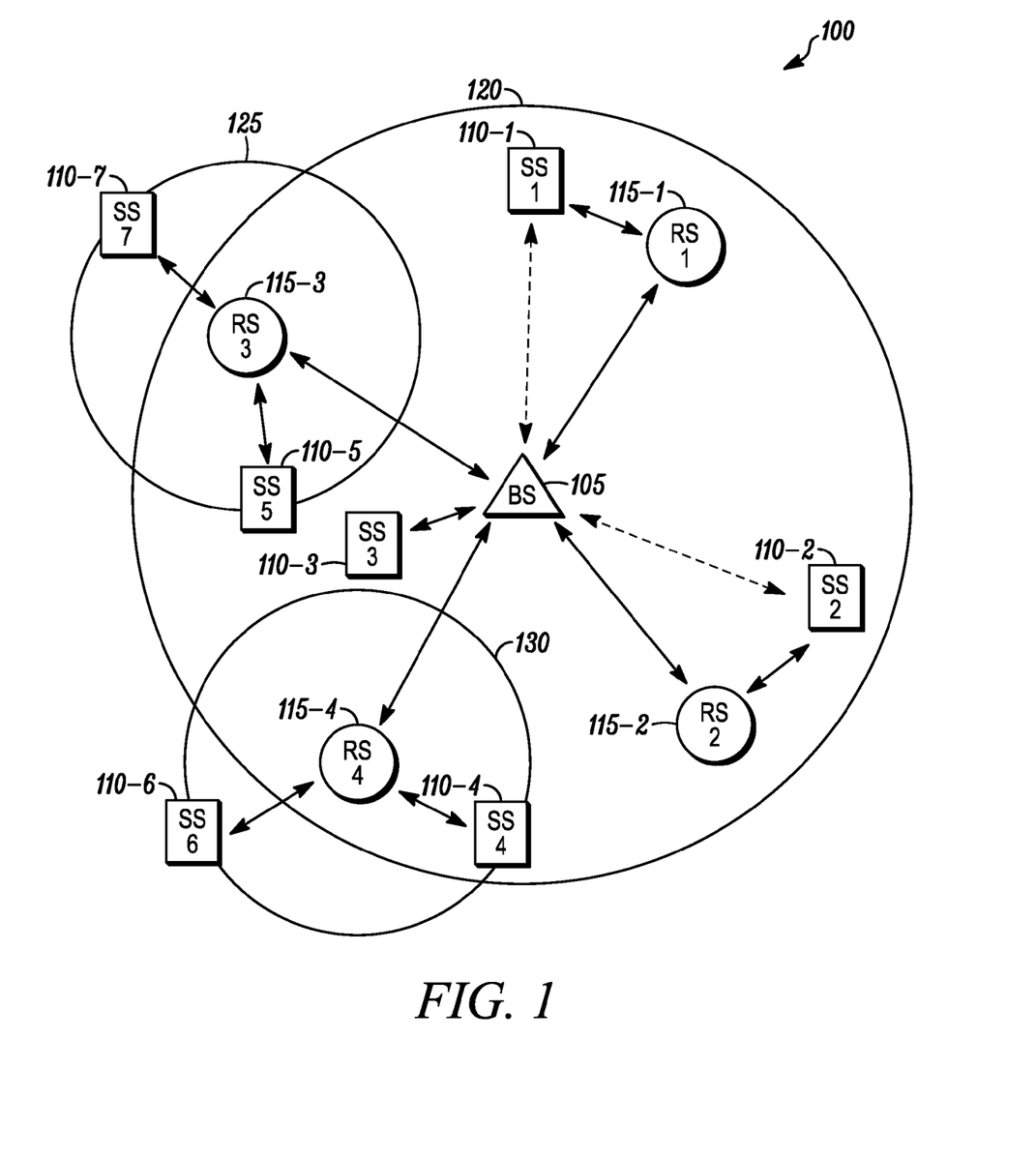
FIG. 1 illustrates an exemplary wireless communication network.

FIG. 1 illustrates an exemplary wireless communication network for use in the implementation of at least some embodiments of the present invention. FIG. 1 specifically illustrates an IEEE 802.16 network 100. As illustrated, the network 100 includes at least one base station 105 for communication with a plurality of subscriber stations 110-*n* (also known as mobile stations). The exemplary network 100 further includes a plurality of relays 115-*n* (also known as relay stations or repeaters). The relays 115-*n* are deployed in the areas with poor coverage and repeat transmissions so that subscriber stations 110-*n* in a cell boundary can connect using high data rate links. In some cases relays 115-*n* may also serve subscriber stations 110-*n* that are out of the coverage range of the base station 105. In some networks, the relays 115-*n* are simpler versions of the base station 105, in that they do not manage connections, but only assist in relaying data. Alternatively, the relays 115-*n* can be at least as complex as the base station 105.

Figure 2:
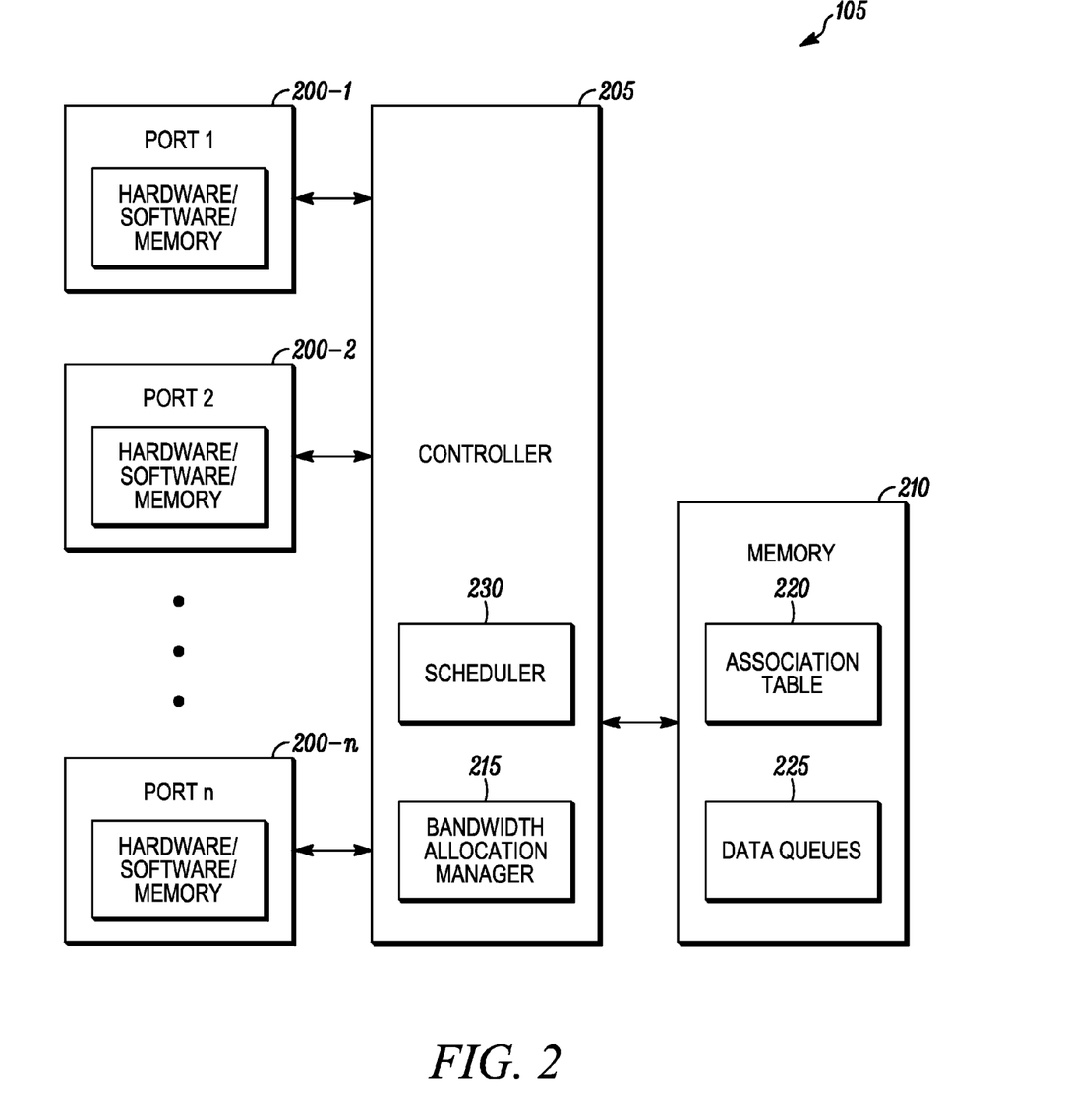
FIG. 2 illustrates an exemplary base station for use in the exemplary wireless communication network of FIG. 1 in accordance with some embodiments of the present invention.

FIG. 2 illustrates an exemplary base station 105 in accordance with at least some embodiments of the present invention. As illustrated, the base station 105 comprises a plurality of ports 200-*n*, a controller 205, and a memory 210.

Each port 200-*n* provides an endpoint or "channel" for network communications by the base station 105. Each port 200-*n* may be designated for use as, for example, an IEEE 802.16 port or a backhaul port. For example, the base station 105 can communicate with one or more relay stations and/or one or more subscriber stations within an 802.16 network using an IEEE 802.16 port. An IEEE 802.16 port, for example, can be used to transmit and receive both data and management information.

A backhaul port similarly can provide an endpoint or channel for backhaul communications by the base station 105. For example, the base station 105 can communicate with one or more other base stations using the backhaul, which can be wired or wireless, via the backhaul port.

Each of the ports 200-*n* are coupled to the controller 205 for operation of the base station 105. Each of the ports employs conventional demodulation and modulation techniques for receiving and transmitting communication signals respectively, such as packetized signals, to and from the base station 105 under the control of the controller 205. The packetized data signals can include, for example, voice, data or multimedia information, and packetized control signals, including node update information.

The controller 205 includes a bandwidth allocation manager 215 for both uplink and downlink bandwidth allocations and the communication thereof to the various subscriber stations (SS) 110-*n* and relay stations (RS) 115-*n* associated with the base station 105, which will be described in detail hereinafter. For example, the bandwidth allocation manager 215 manages allocations for single-hop MS and RS links with the base station 105. It will be appreciated by those of ordinary skill in the art that the bandwidth allocation manager 215 can be hard coded or programmed into the base station 105 during manufacturing, can be programmed over-the-air upon customer subscription, or can be a downloadable application. It will be appreciated that other programming methods can be utilized for programming the bandwidth allocation manager 215 into the base station 105. It will be further appreciated by one of ordinary skill in the art that the bandwidth allocation manager 215 can be hardware circuitry within the base station. In accordance with the present invention, the bandwidth allocation manager 215 can be contained within the controller 205 as illustrated, or alternatively can be an individual block operatively coupled to the controller 205 (not shown).

The controller 205 further includes a scheduler 230 for the management of communication with the various subscriber stations (SS) 110-*n* and relay stations (RS) 115-*n* associated with the base station 105, which is known in the art. It will be appreciated by those of ordinary skill in the art that the scheduler 230 can be hard coded or programmed into the base station 105 during manufacturing, can be programmed over-the-air upon customer subscription, or can be a downloadable application. It will be appreciated that other programming methods can be utilized for programming the scheduler 230 into the base station 105. St will be further appreciated by one of ordinary skill in the art that the scheduler 230 can be hardware circuitry within the base station. In accordance with the present invention, the scheduler 230 can be contained within the controller 205 as illustrated, or alternatively can be an individual block operatively coupled to the controller 205 (not shown). Further, in accordance with the present invention, the scheduler 230 and the bandwidth allocation manager 215 can be individual computing blocks as illustrated, or alternatively can be one combined computing block (not shown).

To perform the necessary functions of the base station 105, the controller 205 is coupled to the memory 210, which preferably includes a random access memory (RAM), a read-only memory (ROM), an electrically erasable programmable read-only memory (EEPROM), and flash memory.

The memory 210 includes storage locations for the storage of an association table 220. The association table 220, in accordance with the present invention, stores a listing of all subscriber stations 110-$n$ and relay stations 115-$n$ under the base station's domain along with other parameters such as the end-to-end path metrics to each of the subscriber stations 110-$n$ and relay stations 115-$n$ under its domain.

The memory 210 further includes storage locations for the storage of one or more data queues 225 maintained at the BS for each connection. The one or more data queues 225 contain data packets destined to the subscriber stations 110 under the base station 105 domain. It will be appreciated that the one or more data queues 225 can be included within the association table 220 or stored in separate memory locations in accordance with the various embodiments of the present invention.

It will be appreciated by those of ordinary skill in the art that the memory 210 can be integrated within the base station 105, or alternatively, can be at least partially contained within an external memory such as a memory storage device. The memory storage device, for example, can be a subscriber identification module (SIM) card.

Figure 3:
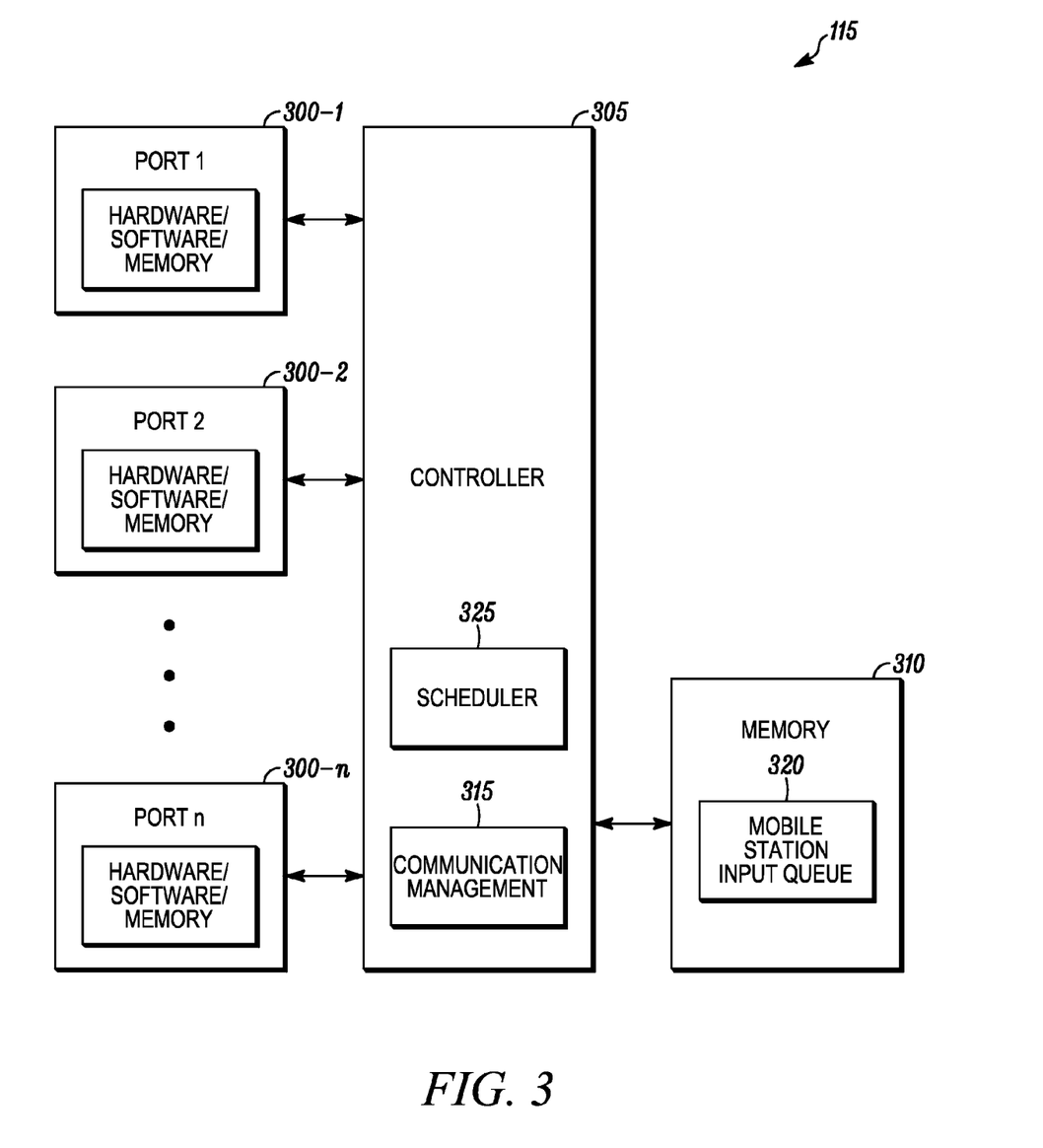
FIG. 3 illustrates an exemplary relay station for use in the exemplary wireless communication network of FIG. 1 in accordance with some embodiments of the present invention.

FIG. 3 illustrates an exemplary relay station 115 in accordance with at least some embodiments of the present invention. As illustrated, the relay station 115 comprises a plurality of ports 300-$n$. Each port 300-$n$ may be designated for use as, for example, an IEEE 802.16 port or a backhaul port. For example, the plurality of ports 300-$n$ can include an IEEE 802.16 port, which is used to communicate with one or more base stations, one or more relay stations and/or one or more subscriber stations. The relay station 115 further comprises a controller 305 and a memory 310.

An IEEE 802.16 port, for example, provides an endpoint or "channel" for 802.16 network communications by the relay station 115. For example, the relay station 115 can communicate with one or more base stations and/or one or more relay stations and/or one or more subscriber stations within an 802.16 network using the IEEE 802.16 port. An IEEE 802.16 port, for example, can be used to transmit and receive both data and management information.

Each of the ports 300-$n$ are coupled to the controller 305 for operation of the relay station 115. Each of the ports employs conventional demodulation and modulation techniques for receiving and transmitting communication signals respectively, such as packetized signals, to and from the relay station 115 under the control of the controller 305. The packetized data signals can include, for example, voice, data or multimedia information, and packetized control signals, including node update information.

In accordance with the present invention, the controller 305 includes a communication management block 315 for managing communication links between the relay station 115 and one or more base stations 105-$n$ and also with one or more subscriber stations 110-$n$ as will be described hereinafter. For example, the communication management block 315 manages the allocation of RS-to-MS and MS-to-RS data bursts to be used in communication with various subscriber stations 110-$n$ in accordance with some embodiments of the present invention. It will be appreciated by those of ordinary skill in the art that the communication management block 315 can be hard coded or programmed into the relay station 115 during manufacturing, can be programmed over-the-air upon customer subscription, or can be a downloadable application. It will be appreciated that other programming methods can be utilized for programming the communication management block 315 into the relay station 115. It will be further appreciated by one of ordinary skill in the art that the communication management block 315 can be hardware circuitry within the relay station 115. In accordance with the present invention, the communication management block 315 can be contained within the controller 305 as illustrated, or alternatively can be individual blocks operatively coupled to the controller 305 (not shown).

The controller 305 further includes a scheduler 325 for the management of communication with the various subscriber stations (SS) 110-$n$ associated with the relay station 115. For example, the scheduler 325 provides autonomous scheduling functions and manages the relay station communication zone as required to satisfy traffic demands of the subscriber stations 110-$n$ it supports. It will be appreciated by those of ordinary skill in the art that the scheduler 325 can be hard coded or programmed into the relay station 115 during manufacturing, can be programmed over-the-air upon customer subscription, or can be a downloadable application. It will be appreciated that other programming methods can be utilized for programming the scheduler 325 into the relay station 115. It will be further appreciated by one of ordinary skill in the art that the scheduler 325 can be hardware circuitry within the relay station 115. In accordance with the present invention, the scheduler 325 can be contained within the controller 305 as illustrated, or alternatively can be an individual block operatively coupled to the controller 305 (not shown). Further, in accordance with the present invention, the scheduler 325 and the communication manager 315 can be individual computing blocks as illustrated, or alternatively can be one combined computing block (not shown).

To perform the necessary functions of the relay station 115, the controller 305, and/or the communication management block 315 and/or the scheduler 325 are each coupled to the memory 310, which preferably includes a random access memory (RAM), a read-only memory (ROM), an electrically erasable programmable read-only memory (EEPROM), and flash memory. The memory 310, for example, includes storage locations for the storage of a mobile station input queue 320 including input queue sizes of the various subscriber stations 110-$n$ the relay station 115 supports based on received bandwidth requests. It will be appreciated by those of ordinary skill in the art that the memory 310 can be integrated within the relay station 115, or alternatively, can be at least partially contained within an external memory such as a memory storage device. The memory storage device, for example, can be a subscriber identification module (SIM) card.

In typical systems such as the network 100, IEEE 802.16 base stations (BSs) do not forward traffic to other base stations on the IEEE 802.16 air interface. Further, IEEE 802.16 Relays (RSs) can forward traffic to base stations, relay stations, or subscriber stations (SSs). As previously mentioned, the relay stations are themselves managed/controlled by at least one of the base stations. Further relay stations can be fixed, nomadic or mobile.

As illustrated in FIG. 1, the relay stations 115-n of the network 100 can provide communication coverage outside the base station coverage area 120. For example, a relay station 3 115-3 provides a coverage area 125 and a relay station 4 115-4 provides a coverage area 130 which include communication coverage outside of a coverage area 120 of the base station 105. Thus communication by relay station 3 115-3 can include communication for subscriber station 7 110-7; and communication by relay station 4 115-4 can include communication for subscriber station 6 110-6, which otherwise would not be possible directly to the base station 105. Since subscriber station 6 110-6 and subscriber station 7 110-7 cannot be controlled by the base station 105 directly, they are entirely controlled by the relay stations 115-4 and 115-3 respectively, or by the base station 105 through the relay stations 115-4 and 115-3 respectively.

In summary, the relay stations (RS) introduced in an IEEE 802.16 system, can provide coverage and capacity gains by extending the base station's (BS) range and permitting subscriber stations (SS) to multihop to the BS.

Figure 4:
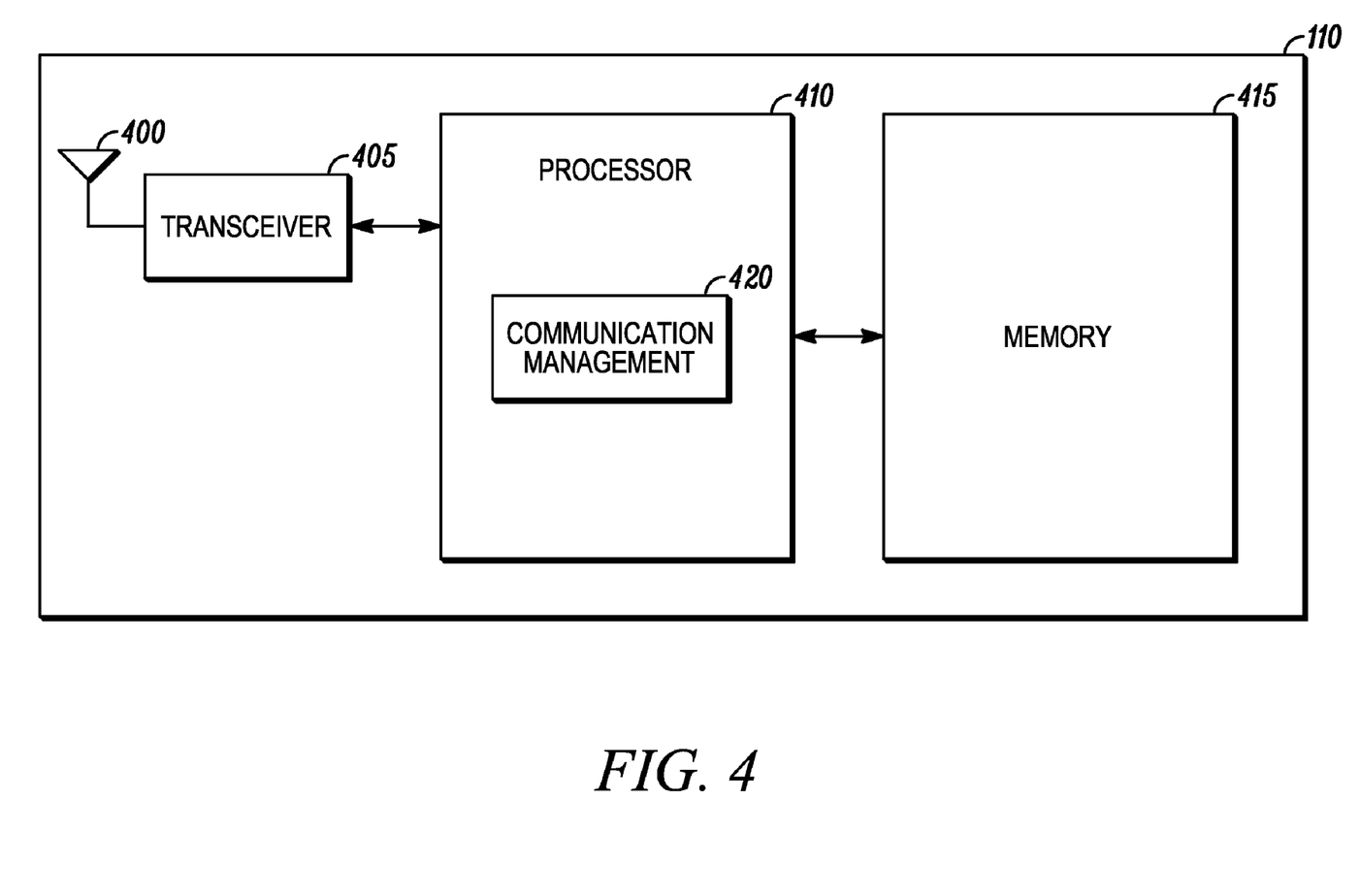
FIG. 4 illustrates an exemplary subscriber station for use in the exemplary wireless communication network of FIG. 1 in accordance with at least some embodiments of the present invention.

FIG. 4 is an electronic block diagram of one embodiment of a subscriber station 110 in accordance with at least some embodiments of the present invention. The terminology "subscriber station" and "mobile station" are used interchangeably herein to refer to subscribers who may be fixed, nomadic or mobile. As illustrated, the subscriber station 110 includes an antenna 400, a transceiver (or modem) 405, a processor 410, and a memory 415.

The antenna 400 intercepts transmitted signals from one or more base stations 105, one or more relay stations 115, and/or one or more subscriber stations 110 within the network 100 and transmits signals to the one or more base stations 105, one or more relay stations 115, and/or one or more subscriber stations 110 within the network 100. The antenna 400 is coupled to the transceiver 405, which employs conventional demodulation techniques for receiving and transmitting communication signals, such as packetized signals, to and from the subscriber station 110 under the control of the processor 410. The packetized data signals can include, for example, voice, data or multimedia information, and packetized control signals, including node update information. When the transceiver 405 receives a command from the processor 410, the transceiver 405 sends a signal via the antenna 400 to one or more devices within the network 100. For example, the subscriber station 110 can communicate with one or more base stations and/or one or more relay stations and/or one or more subscriber stations within an 802.16 network by the antenna 400 and the transceiver 405 using IEEE 802.16, for example, to transmit and receive both data and management information.

In an alternative embodiment (not shown), the subscriber station 110 includes a receive antenna and a receiver for receiving signals from the network 100 and a transmit antenna and a transmitter for transmitting signals to the network 100. It will be appreciated by one of ordinary skill in the art that other similar electronic block diagrams of the same or alternate type can be utilized for the subscriber station 110.

Coupled to the transceiver 405, is the processor 410 utilizing conventional signal-processing techniques for processing received messages. It will be appreciated by one of ordinary skill in the art that additional processors can be utilized as required to handle the processing requirements of the processor 410.

In accordance with the present invention, the processor 410 includes a communication management block 420 for managing communication between the subscriber station 110 and at least one base station 105, relay station 115, or subscriber station 110. For example, the communication management block 420 can send bandwidth allocation requests and/or receive bandwidth allocations from a base station or relay station for which the subscriber station 110 is associated with, as will be described hereinafter. It will be appreciated by those of ordinary skill in the art that the communication management block 420 can be hard coded or programmed into the subscriber station 110 during manufacturing, can be programmed over-the-air upon customer subscription, or can be a downloadable application. It will be appreciated that other programming methods can be utilized for programming the communication management block 420 into the subscriber station 110. It will be further appreciated by one of ordinary skill in the art that the communication management block 420 can be hardware circuitry within the subscriber station 110. In accordance with the present invention, the communication management block 420 can be contained within the processor 410 as illustrated, or alternatively can be an individual block operatively coupled to the processor 410 (not shown).

To perform the necessary functions of the subscriber station 110, the processor 410 is coupled to the memory 415, which preferably includes a random access memory (RAM), a read-only memory (ROM), an electrically erasable programmable read-only memory (EEPROM), and flash memory. It will be appreciated by those of ordinary skill in the art that the memory 415 can be integrated within the subscriber station 110, or alternatively, can be at least partially contained within an external memory such as a memory storage device. The memory storage device, for example, can be a subscriber identification module (SIM) card.

Background

Figure 5:
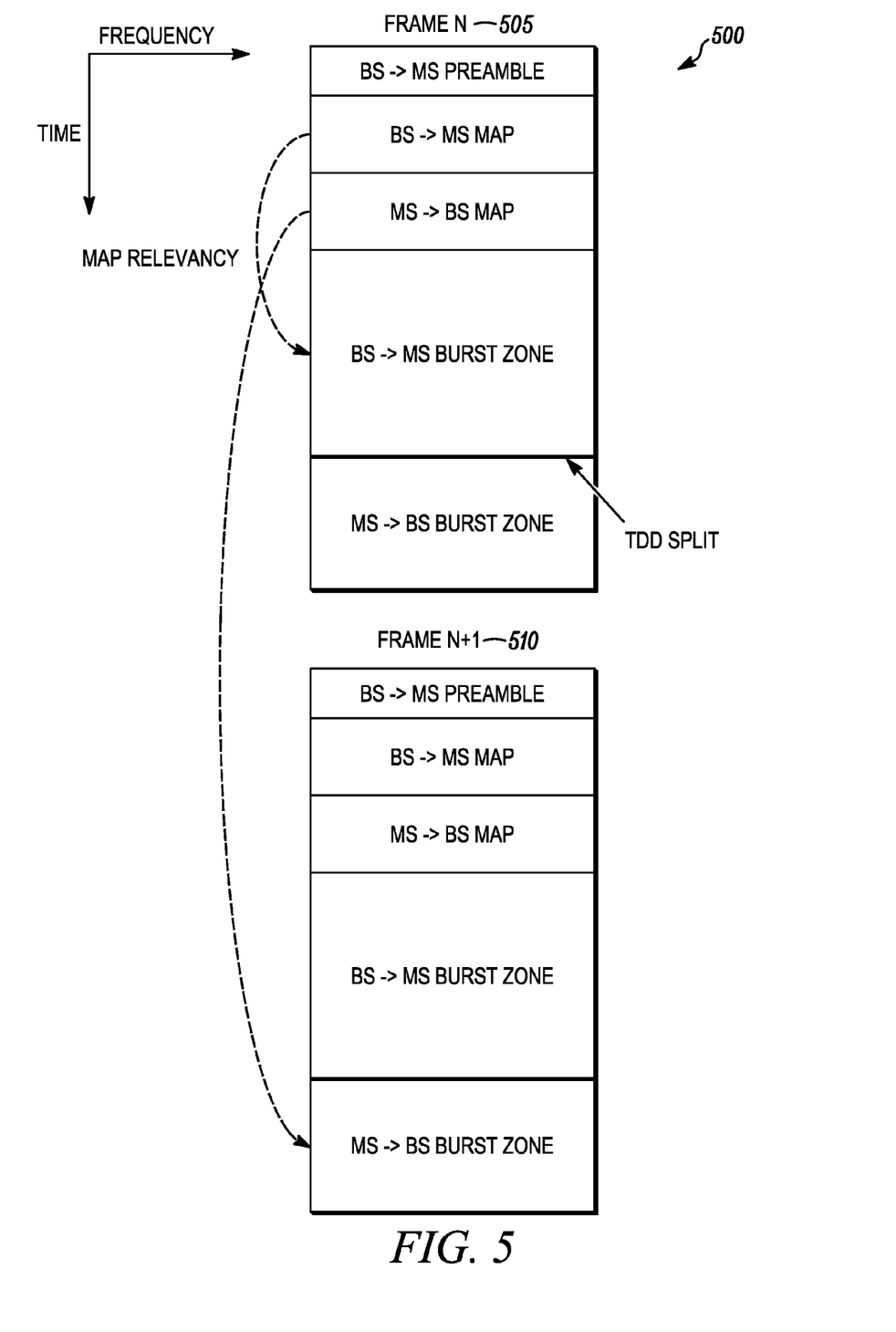
FIG. 5 illustrates a resource allocation scheme in accordance with the 802.16e standard.

The present invention provides a scheduling scheme which builds on the resource allocation protocol standardized at the MAC layer of the 802.16e standard. In 802.16e, both uplink and downlink bandwidth allocations are performed at the base station (BS) and signaled to the mobile station (MS) via downlink and uplink maps located in the beginning of every frame. This resource allocation scheme 500 is conceptually illustrated in FIG. 5. As illustrated, the downlink map specifies resource allocation for the current frame 505, whereas the uplink map provides allocations for the subsequent frame 510. On the downlink, resource allocation is performed based on the depth of the new-data queues separately maintained at the BS for each connection. On the uplink, the new-data queues are maintained at the MS. The state of the MS queues is signaled to the BS by means of a bandwidth request mechanism as is known in the art. Bandwidth requests are periodically transmitted by the MS to the BS on uplink, based on which the BS reconstructs the state of the new-data queues at the MS and makes uplink scheduling decisions.

Scheduling Scheme

Figure 6:
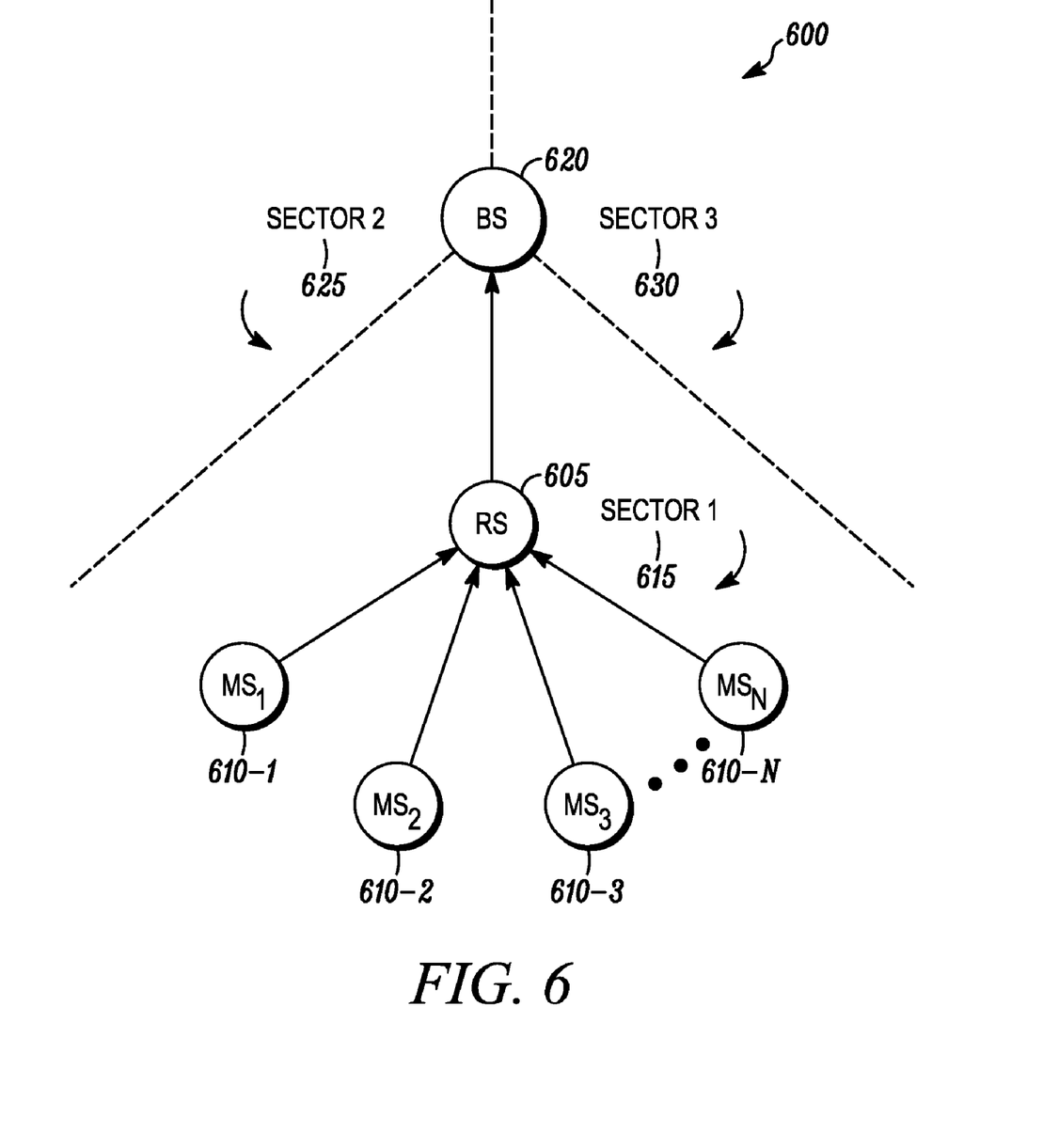
FIG. 6 illustrates an exemplary sector topology of a wireless communication network in accordance with at least some embodiments of the present invention.

The scheduling scheme provided herein is applicable on both downlink and uplink with minor modifications. FIG. 6 illustrates an exemplary sector topology 600 for a 802.16j uplink resource allocation. In this scenario 600, an RS 605 supports some number N of MS 610-N in Sector 1 615 that are communicating with the BS 620 via two hops (i.e. through the RS 605). The base station 620 further supports operation in other sectors such as sector 2 625 and sector 3 630.

Figure 7:
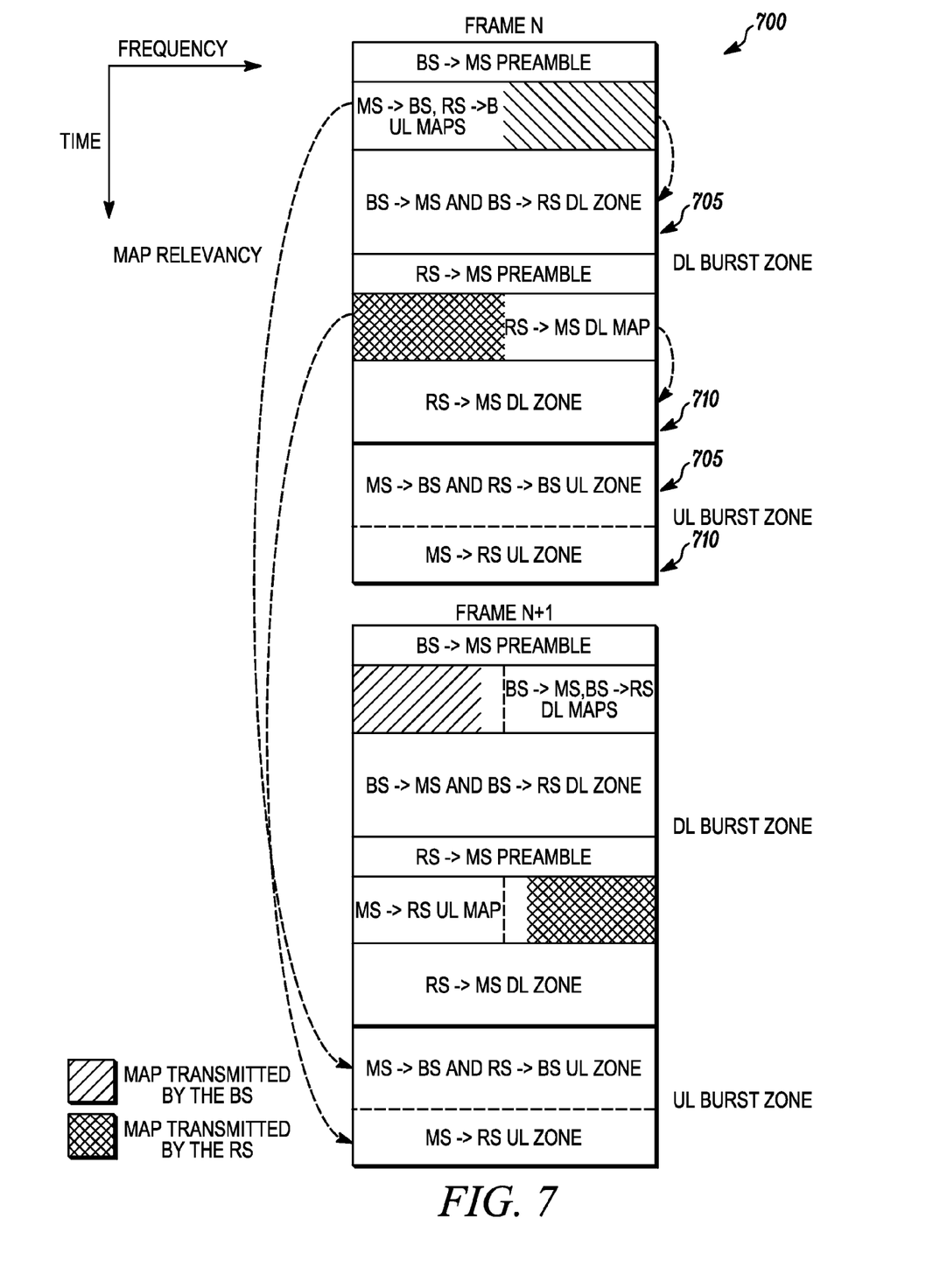
FIG. 7 illustrates a frame structure to enable relay operations with the sector topology of FIG. 6 in accordance with at least some embodiments of the present invention.

To enable relay operation, the uplink and downlink portions of the frame are further subdivided into the BS-managed zones 705 and RS-managed zones 710, as shown in FIG. 7.

Specifically, FIG. 7 illustrates modifications of the 802.16e frame structure to enable relay operations in accordance with at least some embodiments of the present invention. The downlink and uplink RS-managed zones 710 are used for allocation of RS-to-MS and MS-to-RS data bursts, respectively, and are served by a preamble and MAP control messages transmitted by the RS 605. The BS-managed zones 705 utilize preamble and MAP control messages originating at the base station 620 and contain allocations for single-hop MS and RS links with the base station 620. In accordance with at least some embodiments of the present invention, the RS 605 is capable of certain autonomous scheduling functions and manages its zone as required to satisfy traffic demands of the MS 610-N it supports.

The present invention provides a new signaling protocol for efficient allocation of the RS-managed zones 710. It will be appreciated by those of ordinary skill in the art that the method provided for by the present invention is not specific to the frame structure depicted in FIG. 7 and is applicable to any 802.16j system concept where an RS is allocated and manages a relay zone. It will further be appreciated that the BS-managed zone 705 is served by the scheduler residing at the BS 620 and will not be discussed herein. The specifics of the scheduler at the RS 605 for managing the relay-zone 710 will also not be discussed herein.

Uplink Implementation

Referring back to FIG. 6, for exemplary purposes it will be specified that the calls from the N mobile stations MS 610-N supported by the RS 605 are ongoing. The relay operation is transparent to the mobile stations 610-N and, hence, each MS 610-N proceeds to obtain channel resources from the RS 605 via the standard 802.16e bandwidth request mechanism. As specified in the standard, "IEEE Standard for Local and metropolitan area networks Part 16: Air Interface for Fixed Broadband Wireless Access Systems," 802.16-2004, Section 6.3.6.1, bandwidth requests could be aggregate, specifying the total number of bytes contained in the MS input queue, or incremental, only specifying the change in the MS input queue since the last bandwidth request. In any case, the RS 605 obtains estimates of the input queue sizes of the MS 610-N that it supports based on the received bandwidth requests. The present invention utilizes these queue size estimates for determining a longer-term allocation for the uplink RS-managed zone 710. Specifically, let $B_i$ denote the estimate of the input queue size of mobile i, and $L_i$ denote a longer term estimate of the spectral efficiency of the $MS_i$-to-RS link. Since the RS 605 is actively managing the $MS_i$-to-RS link, a stable estimate of $L_i$ is assumed to be available at the RS 605. Furthermore, assume that the allocation from the BS 620 for the RS-managed zone 710 will be in effect for some number of frames $N_f$. Then, the RS can compute the required size (in subcarriers) of the RS-managed zone 710 as follows:

$$S_{RS\,zone} = \frac{1}{N_f} \times f\left(\sum_i \frac{B_i}{L_i}\right) \quad (1)$$

Note that $L_i$ is an estimate of the effective link spectral efficiency that takes into account losses due to multiple Hybrid Automatic Request (HARQ) attempts and signaling overhead, such as Cyclic Redundancy Check (CRC) and medium access control (MAC) headers. The RS 605 thus takes advantage of the multiplexing gain while supporting multiple MS 610-N. This multiplexing gain is reflected in function $f(\ )$ in the above expression, which performs an "effective bandwidth" mapping from the sum of the required bandwidths per connection to an overall estimate of the bandwidth required for the entire RS-managed zone 710. The form of $f(\ )$ will not be discussed herein. For constant rate or nearly constant rate services, such as voice over internet protocol (VoIP) or real-time video, it is more convenient to estimate the required bandwidth based on the average rate of the connection. Then, the expression in (1) can be modified as:

$$S_{RS\,zone} = \frac{1}{N_f} \times f\left(\sum_i \frac{B_i}{L_i}\right) + \tilde{f}\left(\sum_j \frac{R_j \times T_{frame}}{L_j}\right) \quad (2)$$

where $R_j$ denotes the required rate of the $j^{th}$ real-time flow, $T_{frame}$ denotes the frame period, and $\tilde{f}(\ )$ denotes some function performing the "effective bandwidth" mapping for real-time services. Note that the specific expressions in (1) and (2) are given as examples only. The signaling method of the present invention is applicable to any bandwidth estimation methodology.

Figure 8:
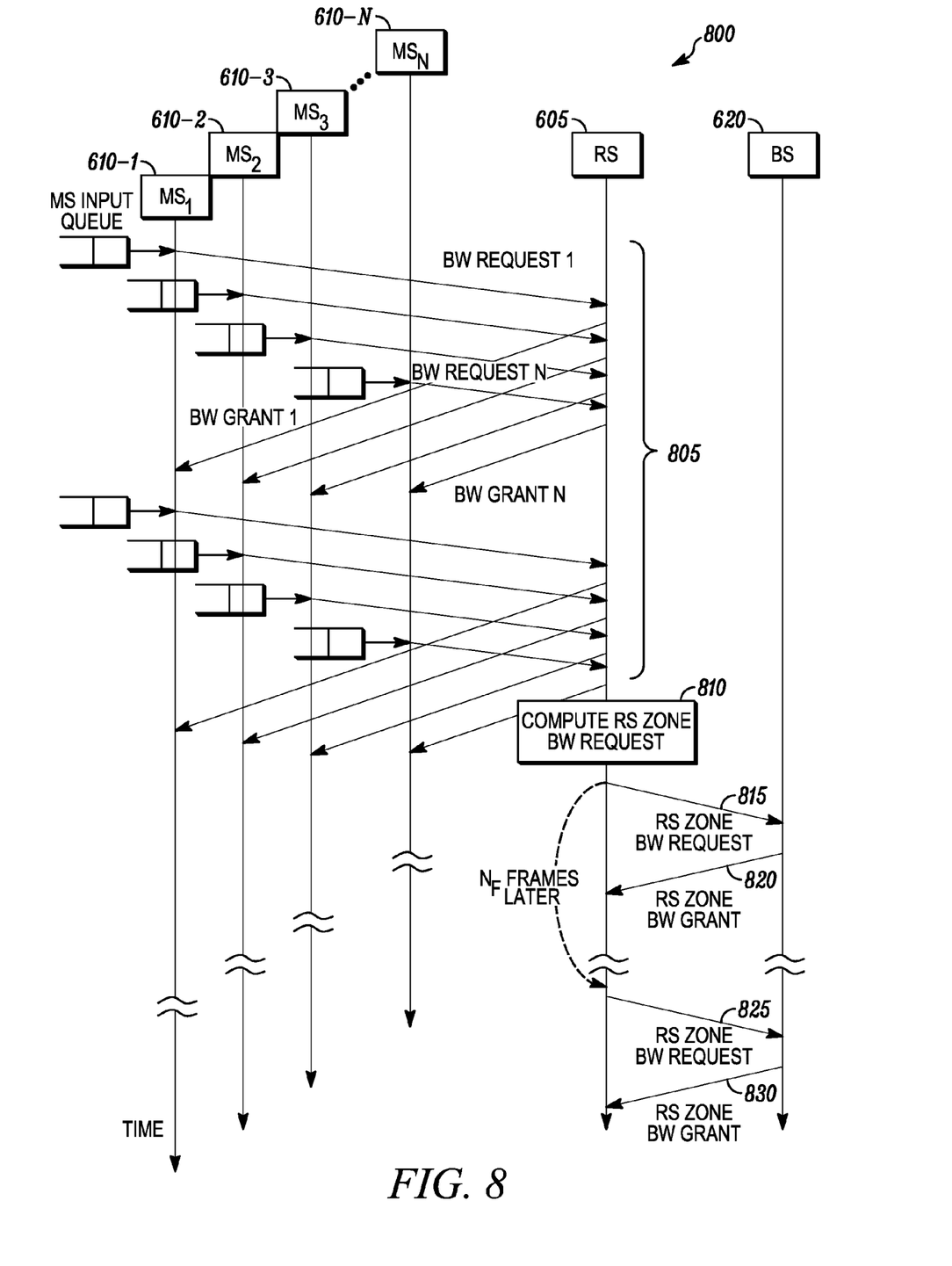
FIG. 8 is a messaging diagram illustrating a signaling protocol for uplink RS-managed zone bandwidth requests within the sector topology of FIG. 6 in accordance with at least some embodiments of the present invention.

FIG. 8 is a messaging diagram 800 illustrating the signaling protocol for uplink RS-managed zone bandwidth requests in accordance with at least some embodiments of the present invention. As illustrated by reference 805, the mobile stations 610-N utilize the standard 802.16e bandwidth request/grant process with the relay station 605. Based on the accumulated BW requests, the RS 605 computes an overall BW request (reference 810) for the entire RS-managed zone 710 for the next $N_f$ frames. The RS 605 sends the computed RS zone bandwidth request 815 to the base station 620. The BS 620 responds with the RS-managed zone bandwidth grant 820 valid for the next $N_f$ frames. As illustrated, the request 825 and grant 830 communications between the RS 605 and BS 620 can be repeated $N_f$ frames later. No additional signaling is required at the BS 620 for scheduling the MS-to-RS bursts. The RS 605 relies on its scheduling function for managing the MS-to-RS links under its control in the bandwidth granted by the BS 620. Note that unlike the MS bandwidth request in 802.16e, the RS-managed zone request 815, 825 is in terms of subcarriers or physical layer slots and not in terms of raw data bytes. Furthermore, the RS-managed zone bandwidth grant 820, 830 is in effect for $N_f$ frames, whereas all allocations on the uplink of an 802.16e system apply only to the following frame. The parameter $N_f$ can be optimized to minimize signaling complexity while maintaining ability to react to the changing traffic demands at the MS 610-N. Note that with this methodology, the BS scheduler requires no knowledge of the channel state information for the MS-to-RS links, further minimizing signaling overhead.

The BS 620 is not constrained to sending the RS-managed zone bandwidth grants only in response to the RS bandwidth requests. Based on bandwidth requests received from single-hop MS or possibly from another RS, the BS 620 may alter bandwidth allocation of any relay zone under its control at any time by sending an unsolicited RS-managed zone bandwidth grant. Any RS receiving a fresh bandwidth grant is obligated to abide by the most current relay zone allocation. If necessary, the BS 620 may cause the relay station not to send DL or schedule UL data for a predetermined period of time by sending a null bandwidth grant for the RS-managed zone.

Network Entry

The uplink RS bandwidth allocation scheme of the present invention can be naturally extended to accommodate an MS 610-N attempting to establish a communication session through an intermediate RS 605. The MS 610-N follows standard network entry and dynamic service flow creation procedures as is known in the art. As part of the admission control procedures, the BS 620 needs to learn the user quality of service (QoS) profile and the associated data rate requested for the connection. The requested rate, $R_{req}$, can be specified as the average data rate for the connection or as the minimum and maximum rates for the connection. Note that the details of the dynamic service flow procedures for relayed connections will not be discussed herein. Once $R_{req}$ is known for an admitted flow, the BS 620 can compute the size of the RS-managed zone 710 as follows:

$$S_{RZ\,zone} = \frac{1}{N_f} \times f\left(\sum_i \frac{B_i}{L_i}\right) + \tilde{f}\left(\sum_j \frac{R_j \times T_{frame}}{L_j}\right) + T_{frame} \times \sum_k \frac{R_{req,k}}{L_k} \quad (3)$$

where $R_{req,k}$ denotes the requested rate for the $k^{th}$ admitted connection. The requested rate can be replaced in (3) by the MS input queue size or the actual rate of the connection, once the MS 610-N begins the bandwidth (BW) request process.

Downlink Implementation

On the downlink, the BS scheduler has direct knowledge of the state of the input queues for all MS 610-N served in its cell. Hence, the MS bandwidth request mechanism defined for the uplink is not necessary for the downlink. The BS scheduler computes the size of the downlink RS-managed zone as specified in (1)-(3). However, since the BS 620 does not actively manage the RS-to-MS links, it has no knowledge of the RS-to-$MS_i$ link spectral efficiency, $L_i$. In at least some embodiments of the present invention, these estimates are periodically supplied to the BS 620 by the RS 605 for proper relay zone dimensioning.

Figure 9:
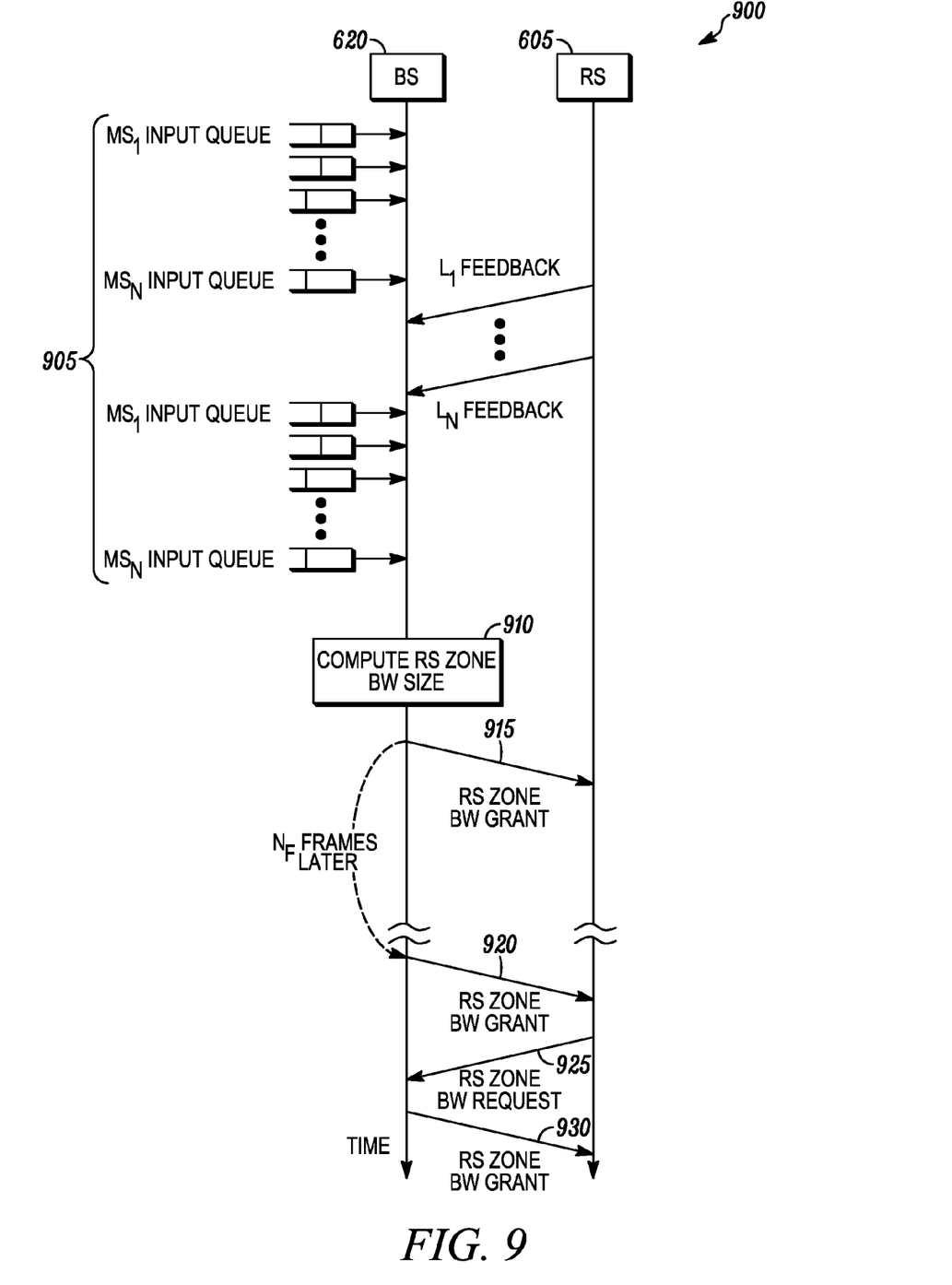
FIG. 9 is a messaging diagram illustrating a signaling protocol for a downlink relay zone allocation process within the sector topology of FIG. 6 in accordance with at least some embodiments of the present invention.

The downlink relay zone allocation process 900 is illustrated in the messaging diagram of FIG. 9. Based on the sizes of the MS input queues 905, the BS 620 periodically computes 910 the size of the relay zone and announces 915 the allocation to the RS 605. This allocation is valid until the next bandwidth grant 920 from the BS 620. It is possible that, due to inaccurate or stale knowledge at the BS 620 of the RS-to-MS link spectral efficiencies, the bandwidth grants 915, 920 for the RS-managed downlink zone are insufficient to carry all of the traffic destined to the two-hop MS 610-n supported in the zone. In this case, unsent downlink data will begin to accumulate at the RS 605. To remedy this situation, the RS 605 can send an unsolicited downlink RS zone bandwidth request 925 informing the BS 620 of the allocation shortage. The BS 620 may rectify the shortage by immediately allocating more bandwidth to the RS-managed zone and sending a new relay station zone bandwidth grant 930 or by appropriately throttling down the rates on the first-hop, BS-to-RS, links.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method for allocating bandwidth within a multihop wireless communication network comprising:
   at a relay station:
      receiving and storing a first bandwidth allocation request from each of a plurality of subscriber stations associated with a relay station-managed zone, wherein each first bandwidth allocation request from each of the plurality of subscriber stations indicates a number of bytes in a corresponding subscriber station input queue;
      computing a first total number of bytes required for the relay station-managed zone using a sum of the received first bandwidth allocation requests and an estimate of spectral efficiency of a link between each of the one or more subscriber stations and the relay station;
      determining first subcarriers or physical layer slots based on the first total number of bytes; and
      requesting the first total number of bytes required for the relay station-managed zone in terms of the determined first subcarriers or physical layer slots from an associated base station.

2. A method for allocating bandwidth to a relay station within a multihop wireless communication network as claimed in claim 1, further comprising:
   at the base station:
      assigning an aggregated bandwidth allocation grant back to the relay station.

3. A method for allocating bandwidth to a relay station within a multihop wireless communication network as claimed in claim 2, further comprising:
   at the relay station:
      assigning individual bandwidth allocation grants to each of the plurality of subscriber stations.

4. A method for allocating bandwidth to a relay station within a multihop wireless communication network as claimed in claim 1, further comprising prior to the computing step:
   at the relay station:
      storing the number of bytes in the input queues of each of the plurality of subscriber stations.

5. A method for allocating bandwidth to a relay station within a multihop wireless communication network as claimed in claim 1, further comprising:
   at the base station:
   receiving a total number of bytes in terms of subcarriers or physical layer slots from one or more other network entities; and
   sending a relay station bandwidth reallocation to the relay station based on the received total number of bytes.

6. A method for allocating bandwidth to a relay station within a multihop wireless communication network as claimed in claim 5, wherein the relay station bandwidth allocation comprises a null bandwidth grant, wherein the null bandwidth grant causes the relay station to suspend the communication of downlink and uplink data for a predetermined period of time.

7. A method for allocating bandwidth to a relay station within a multihop wireless communication network comprising:
   requesting bandwidth allocation by at least one subscriber station from the relay station wherein the bandwidth allocation request indicates a number of bytes in the at least one subscriber station, the at least one subscriber station associated with a relay station-managed zone;

computing, by the relay station, a total number of bytes required for the relay station-managed zone using the requested bandwidth allocation associated with the at least one subscriber station and an estimate of spectral efficiency between the at least one subscriber station and the relay station for at least one next communication frame;

determining subcarriers or physical layer slots based on the computed total number of bytes;

sending a request for the computed total number of bytes in terms of determined subcarriers or physical layer slots for the at least one next communication frame from the relay station to an associated base station; and granting a bandwidth allocation for the at least one next communication frame by the base station.

8. A method for allocating bandwidth to a relay station within a multihop wireless communication network as claimed in claim 7, further comprising:

repeating the sending and granting steps at a time of the at least one next communication frame.

9. A method for allocating bandwidth to a relay station within a multihop wireless communication network as claimed in claim 7, wherein the at least one next communication frame comprises a predetermined number of frames, wherein the predetermined number of frames is selected to minimize signaling complexity while maintaining an ability to react to changing traffic demands at the subscriber stations.

10. A method of operation of a base station for allocating bandwidth to a relay station for downlink communication within a multihop wireless communication network comprising:

determining a subscriber station input queue size associated with downlink data for each of a plurality of subscriber stations managed by the relay station;

computing a relay station zone size as an aggregation of each of the subscriber station input queue sizes associated with downlink data;

providing the relay zone size to the relay station;

receiving a downlink relay station zone bandwidth request from the relay station including information of an allocation shortage; and sending a new relay station zone bandwidth allocation to the relay station.

11. A method of operation of a base station for allocating bandwidth to a relay station for downlink communication within a multihop wireless communication network as claimed in claim 10, further comprising:

periodically repeating the determining, computing, and providing steps.

12. A method for allocating bandwidth to a relay station within a multihop wireless communication network as claimed in claim 1, further comprising at the relay station:

receiving and storing a second bandwidth allocation request from at least one of the plurality of subscriber stations associated with the relay station-managed zone, wherein the second bandwidth allocation request from the at least one of the plurality of subscriber stations indicates a change in the number of bytes in the corresponding subscriber station input queue;

computing a second total number of bytes required for the relay station-managed zone based on the received first and second bandwidth allocation requests;

determining second subcarriers or physical layer slots based the second total number of bytes; and requesting the second total number of bytes required for the relay station-managed zone in terms of determined second subcarriers or physical layer slots from the associated base station.

\* \* \* \* \*

UNITED STATES PATENT AND TRADEMARK OFFICE
CERTIFICATE OF CORRECTION

PATENT NO. : 7,894,388 B2  Page 1 of 1
APPLICATION NO. : 11/620531
DATED : February 22, 2011
INVENTOR(S) : Visotsky It is certified that error appears in the above-identified patent and that said Letters Patent is hereby corrected as shown below:

In Column 5, Line 1, delete "St" and insert -- It --, therefor.

In Column 11, Line 14, in Equation (3), delete "$S_{RZ\ zone}$" and insert -- $S_{RS\ zone}$ --, therefor.

Signed and Sealed this
Fifteenth Day of January, 2013

David J. Kappos
*Director of the United States Patent and Trademark Office*